United States Patent [19]

Kerr

[11] Patent Number: 4,748,653
[45] Date of Patent: May 31, 1988

[54] TOLL FRAUD CONTROL OVERRIDE

[75] Inventor: Howard A. Kerr, West Chicago, Ill.

[73] Assignee: American Telephone and Telegraph Company, AT&T Bell Laboratories, Murray Hill, N.J.

[21] Appl. No.: 901,960

[22] Filed: Aug. 29, 1986

[51] Int. Cl.⁴ .............................................. H04N 1/66
[52] U.S. Cl. ....................................... 379/32; 379/189
[58] Field of Search ................. 379/189, 32, 196, 197, 379/198, 199, 200, 208, 250, 95, 112, 115, 116, 121, 145

[56] References Cited

U.S. PATENT DOCUMENTS 3,952,160  4/1976  Pasternack et al. ................ 379/145
4,182,934  1/1980  Keys et al. .......................... 379/189
4,284,851  8/1981  Schweitzer et al. ................ 379/189

OTHER PUBLICATIONS

C. Breen et al., "Signaling Systems for Control of Telephone Switching", *The Bell System Technical Journal*, vol. 39, No. 6, Nov., 1960, pp. 1381-1443.

*Primary Examiner*—James L. Dwyer
*Attorney, Agent, or Firm*—Richard J. Godlewski

[57] ABSTRACT

Apparatus and method are disclosed for overriding a fraud control feature utilized by a switching system to disable communications over a unidirectional path serving a call until answer supervision is returned for the call. The switching system includes a fraud control unit which inserts idle code into the unidirectional transmit path serving the call and disables communications on the path from a calling to a called line. However, normal call progress signals are allowed to pass on the receive path from the called to the calling line. The fraud control unit includes an idle code generator for generating the idle code and a selector for inserting either the idle code from the generator or the communications on the transmit path from the caller. The selector is controlled by a control unit under the control of the central processor of the switching system. When an override signal is received on an operator trunk, the central processor causes the fraud control unit to remove the disabling of communications on the transmit path so that normal communication may proceed from the calling to the called line. An operator position under the control of an operator also initiates billing and trouble records for the call when an absence of answer supervision is indicated and information is received that the call has been actually answered.

18 Claims, 4 Drawing Sheets

TOLL FRAUD CONTROL OVERRIDE

CROSS-REFERENCE TO RELATED APPLICATION

This application is related to the application of R. L. Else and K. D. Frantzen, entitled "Toll Fraud Control", U.S. Ser. No. 901,959, filed concurrently with this application.

TECHNICAL FIELD

This invention relates to communication switching systems and particularly to a method of and apparatus for overriding or canceling a feature of a telephone system in which communications are disabled on a unidirectional path to prevent fraudulent calls.

BACKGROUND OF THE INVENTION

Fraudulent calls, such as well-known "blue box" and "black box" calls, cost telephone companies, particularly interconnect carriers, huge financial sums both in lost revenue for those calls and in the payment of access charges for those calls to local exchange carriers.

The concurrently filed application of R. L. Else and K. D. Frantzen describes a toll fraud control feature for disabling communications on the transmit path of a four-wire call connection until a valid call answer signal is received and verified at a controlling office to bill the user for the call. That arrangement frustrates "blue box" access and satisfactorily precludes "black box" calls from being completed through the network.

However, the toll fraud control arrangement does not differentiate between legitimate and fraudulent calls and disables communications on the transmit path of every call passing through a switching system. Until valid answer supervision is received for the call, communications on the transmit path remain disabled. As a result, customers attempting to place legitimate calls through the interconnect network to a called line having faulty equipment or a "black box" connected thereto will not have their calls completed. Prevented from completing a call, a caller attempting to place a legitimate call will typically seek the assistance of an operator to complete the call for the caller. However, the problem is that an operator, like the customer, will encounter disabled communications on the transmit path for the call due to the toll fraud control arrangement and will not be able to assist the customer and to bill the customer for the call.

SUMMARY OF THE INVENTION

The foregoing problem is solved and a technical advance is achieved in an illustrative embodiment of the invention in which operator facilities and switching equipment provide an operator with information indicating the absence of an answer supervision signal for a call and information indicating a concurrent actual answer of the call and enable that operator to override the toll fraud control arrangement in such a way as to remove the disabling of call communications and furthermore to bill the user for the call.

An advantage of this invention is that the telephone company with the operator processing the call is able to compile information regarding "no answer" supervision type calls which may originate from "black box" users or defective and faulty equipment. Obviously, the arrangement permits the detection and apprehension of "blue box" and "black box" users. For every such call handled by an operator, the operator will file a report with a Network Operator Trouble Information System which has a computer system for collecting information on operator assisted calls indicating a problem such as an absence of answer supervision. The computer system generates reports for regional network service centers where they are analyzed to discover patterns of such calls so that an appropriate methods group or customer is notified of the problem. This operator override feature advantageously enables the telephone company to be paid and also to be advised of trouble conditions.

The toll fraud control override is initiated at the operator position and controlled by the operator depressing a "ring forward signal" key at her position and sending an override signal on an operator trunk to the originating toll switching system office. A programcontrolled processor of the toll office then causes a removal of the disabling by removing the idle code being inserted on the transmit path for, in turn, restoring communications on the transmit path from the caller to the called destination.

Another feature of this invention is that this toll fraud control override feature is illustratively effective only on trunks extending from the operator position. The recognition of operator trunks for controlling the override is accommodated by program instruction intelligence in the processor of the switch. The simulation of operator override signals on other trunks such as those that would be utilized by a "blue box" caller are disregarded by the toll switching system obviously to preclude illegitimate calls. The processor is enabled to have this unique override feature due to the characteristics of each trunk served by the switching system being stored in the data memory.

The operator position may be colocated with the toll office or remotely located. When remotely located, the operator is equipped with an answer supervision display to indicate an absence of answer supervision from a called line and receives information from the called line indicating an actual answer of the call. When the call is actually answered without answer supervision being returned, the operator overrides the fraud control feature of the toll office by depressing the "ring forward signal" key at the operator system and sending an override signal to the switching system. The override also initiates charging operations billing the caller for the call. The toll switching system receiving the override signal on an operator trunk responds by removing the disabling of communications or by establishing a unidirectional path from the calling to the called line in addition to the already established unidirectional call connection path from the called to the calling line.

The fraud control unit of the switching system includes means such as a generator and selector for inserting idle code onto a unidirectional path of a call to disable communications on that path and placing the path in a noncommunicative state. When answer supervision or the override signal is received by the switching system, the fraud control unit removes or withdraws the inserting of idle code to place the path in a communicative state,, and effects a forwarding of communications from the calling to the called line.

DETAILED DESCRIPTION

Figure 1:
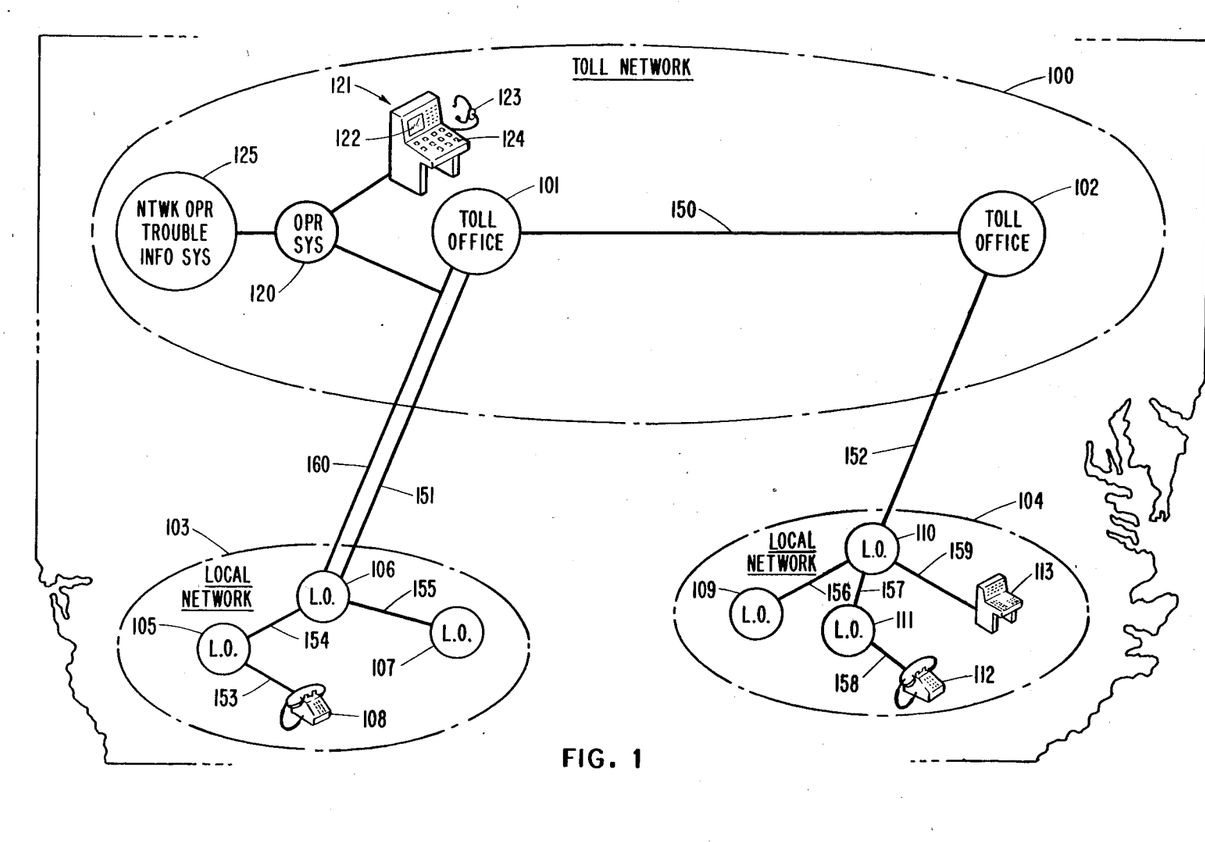
FIG. 1 depicts an illustrative interconnect carrier network interconnecting two local exchange carrier networks.

Depicted in FIG. 1 is an illustrative toll interconnect carrier network 100 including a plurality of communication lines such as well-known four-wire trunk group 150 interconnected by a plurality of toll switching system offices such as 101 and 102 for serving a plurality of local exchange carrier networks such as 103 and 104 via four-wire trunk groups 151 and 152, respectively. A plurality of operator systems such as 120 including operator position 121 are also included in toll network 100 for assisting in the completion of customer calls from, for example, local network 103 via operator trunk group 160. Connected to each operator system is a well-known network operator trouble information system 125 for receiving trouble records from operator systems indicating potential faulty equipment or fraudulent use of network facilities. Trouble information system 125 includes a well-known computer system (not shown) for generating reports of the trouble records for interconnect carrier personnel to investigate.

Each communication line in a four-wire trunk group, includes circuitry and transmission facilities for establishing two unidirectional call connection paths between a calling and a called line. One of the two unidirectional call connection paths designated the transmit portion or path facilitates the transmission of communications in only one direction from the calling to the called line, whereas the other unidirectional call connection path designated the receive portion path facilitates the transmission of communications in the opposite direction from the called to the calling line.

Each of the toll offices in interconnect network 100 includes an illustrative switching system having a fraud control unit for disabling communications on the transmit path from a calling to a called line and utilizes an illustrative method of processing calls including fraudulent ones such as well-known "blue box" and "black box" calls from completing through the toll network until valid answer supervision is received for the call. The use of these so-called "blue boxes" and "black boxes" by unscrupulous individuals avoids or alters the generation of records to correctly bill for the call when calling through the toll network. A more sophisticated form of abuse employs "intelligent" equipment such as a private branch exchange (PBX) or answering machines programmed not to signal the network to begin billing. The illustrative system and method utilized in toll offices 101 and 102 prevents fraudulent calls by disabling communications on the unidirectional call connection path from the calling to the called line until a valid "answer supervision" signal is received for the call. The unidirectional receive path from the called to the calling line is established and maintained so that the caller will hear all of the normal network signals such as ringing, busy, or recorded announcements, but the disabled communications on the transmit path makes it impossible for the caller to be heard by the person being served by the called line. This commonly frustrates the caller and called customer causing them typically to hang up.

When the fraud control of a toll switching system prevents the completion of a call, a frustrated caller attempting to make a legitimate call will typically seek the assistance of an operator to correct the problem and complete the call. In so doing, the caller, for example, is routed from local network 103 to operator position 121 via operator trunk group 160. The operator, like the customer, attempts to complete the call without success due to the fraud control feature of toll office 101. However, the operator position is equipped with a well-known electronic answer supervision display 122 to indicate an absence of answer supervision from the called destination. The operator, like the customer, can hear voice communication from the called party via headset 123 indicating that the call has actually been answered. To assist the customer and complete the call connections, the operator depresses the well-known "ring forward" signal key 124 at the position to send a fraud control override signal to toll switch 102 which responds by removing the disabling of communications on the transmit path to the called line. With two-way communication established, the operator causes the operator system to initiate a billing record to charge the caller for the call in a well-known manner. The operator will also initiate a trouble record for information system 125 to generate a report for the interconnect carrier to isolate faulty equipment or to discover fraudulent "black box" and the like use.

A typical operator system such as the traffic service position system for use with local and toll offices is described in *The Bell System Technical Journal*, Vol 49, No. 10, December, 1970, and Vol 58, No. 6, Part 1 or 2, July-August, 1977, and in U.S. Pat. No. 3,484,560 of R. J. Jaeger, Jr. issued Dec. 16, 1969. An operator system included as part of a switching system is the 5ESS TM digital switch Operator Service Position available from AT&T. Another operator system included as part of a switching system is the Traffic Operator Position System available from Northern Telecom. Located remotely from, colocated with, or part of a switching system, the operator system and associated operator position processes calls via trunks having special supervisory signaling capabilities to assist customers.

Local network 103 includes a plurality of local exchange telephone switching system offices such as 105-107 which in turn serve a plurality of customers such as one at telephone station set 108 connected to local telephone office 105 via well-known two-wire communication line 153. In addition, one or more of the local offices such as 106, commonly known as an access tandem, may be used to interconnect other local offices such as 105 and 107 via trunk groups 154 and 155, respectively. Similarly, local network 104 includes a plurality of local switching system offices such as 109-111 which in turn serves customers at, for example, customer station set 112 and private branch exchange 113 interconnected as shown by communication lines 156-159.

By way of example, each of local telephone offices 105-107 and 109-111 may suitably be an electronic program-controlled switching system of the type disclosed in U.S. Pat. No. 3,570,008, issued to R. W. Downing et al., on Mar. 19, 1971, and similarly disclosed in *The Bell System Technical Journal*, Vol. 43, No. 5, Parts 1 and 2, September, 1964. An updated central processor suitable for use in this switching system is described in is The Bell System Technical Joournal, Vol. 56; No. 2; February, 1977. These references may be consulted for a more comprehensive understanding of the construction and operation of an electronic program-controlled local switching system office.

Each of toll switching system offices 101 and 102 is suitably an electronically program-controlled switching system such as the 4ESS TM digital switch available from AT&T. This digital switch is described in detail in the *The Bell System Technical Journal*, Vol. 56, No. 7, September, 1977, and Vol. 60, No. 6, Part 2, July-August, 1981. These references may be consulted for a comprehensive understanding of the construction and operation of a toll switching system. Toll switching system offices such as 101 and 102 selectively interconnect individual trunks in response to routing information such as the telephone number of a called customer line received from a local office.

Figure 2:
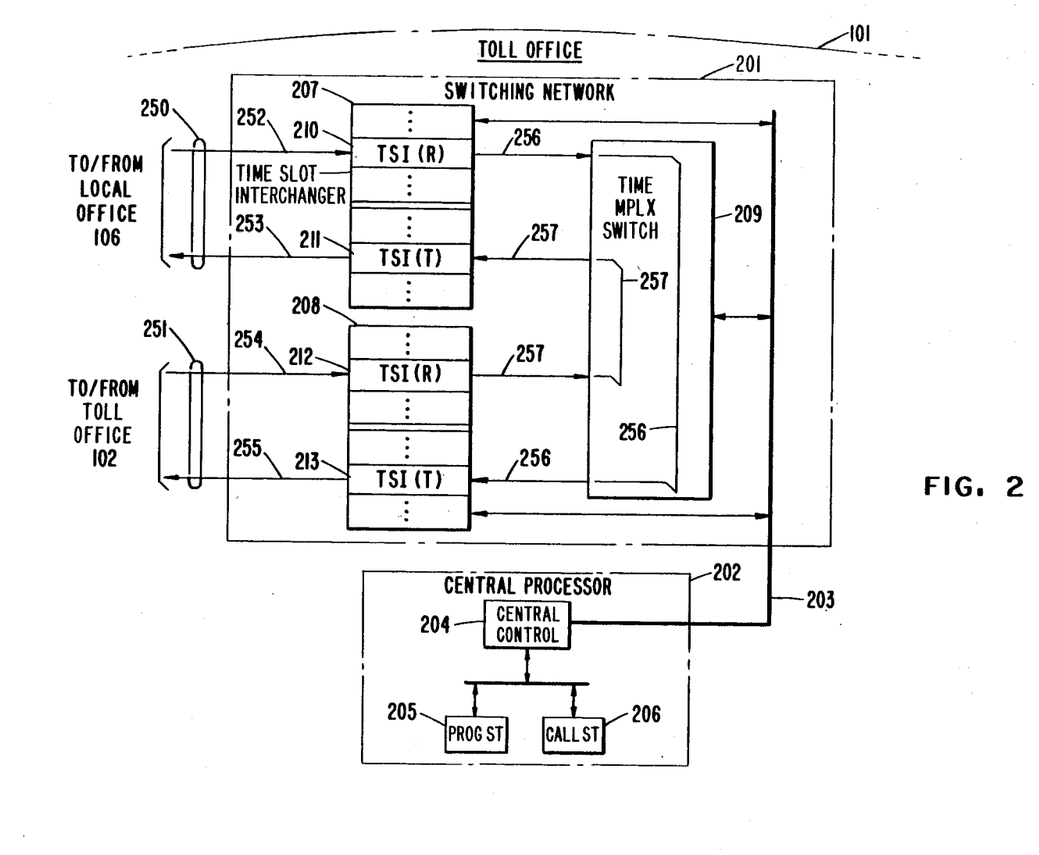
FIG. 2 is a block diagram of an illustrative toll switching system office included in the interconnect carrier of FIG. 1.

Depicted in FIG. 2 is a block diagram of toll switching system 101 which includes switching network 201 and central processor 202 interconnected by peripheral unit bus 203. The switching network interconnects the incoming and outgoing four-wire unidirectional call connection paths of communication lines such as 250 and 251 in respective trunk groups 150 and 151 under the control of program-controlled central processor 202. The central processor includes central control 204, a number of well-known program memories such as program store 205 for storing program instructions that control the 35 operation of the switch, and a number of well-known data memories such as call store 206 for storing temporary call data and translations information.

The majority of the logic, control, and translations functions required for the operation of the toll switching system are performed by central processor 202. A typical processor suitable for use in the illustrative toll switching system is described in *The Bell System Technical Journal*, Vol. 56, No. 2, February, 1977.

Central control 204 is the information processing unit of the system and executes the program instructions resident in program store 205 using the call processing data in call store 206.

Stored in call store 206 is well-known translations information on each trunk group served by the switching system. This information includes the characteristics of the trunk group such as the type of supervisory signaling that may be sent and received thereon. As a result, the switching system will respond to certain operator supervisory signals from an operator system to assist in completing calls. However, the switching system will not respond to these operator signals when received on non-operator trunk groups. In this illustrative embodiment, a fraud control override signal in the form of a well-known "ring-forward" supervisory signal is sent from operator system 120 on trunk group 160 to toll switch 102 via switch 101 to override the fraud control feature and remove the disabling of communications on the transmit path. Since a toll switch will only respond to the "ring forward" supervisory signal on an operator trunk or forwarded from another toll switch, the toll network is protected from fraudulent users attempting to introduce operator supervisory signals on non-operator trunks.

Switching network 201 has a time-space-time switching configuration utilizing time slot interchange (TSI) units such as 207 and 208 and time multiplex switch (TMS) unit 209. Time slot interchange unit 207 includes a plurality of well-known switching and permuting circuits such as 210 for receiving data via serial DS-120 format unidirectional incoming path 252. In addition, time slot interchange unit 207 includes another plurality of switching and permuting circuits such as 211 for performing the final space and time switching function before transmitting the data on serial DS-120 format unidirectional outgoing path 253. Similarly, time slot interchange unit 208 includes a plurality of switching and permuting circuits such as receive circuit 212 and transmit circuit 213 for receiving and transmitting data on respective unidirectional incoming and outgoing paths 254 and 255.

Time multiplex switch 209 is a well-known two-stage space division switch for interconnecting the receive and transmit circuits of time slot interchange units 207 and 208. As shown in the transmit portion of the four-wire call connection from calling line 153 to called line 158 via interconnecting lines 250 and 251 of FIG. 2, TMS path 256 connects incoming path 252 and receive circuit 210 to transmit circuit 213 and outgoing path 255. In the receive portion of the call connection in the opposite direction from the called to the calling line, TMS path 257 connects incoming path 254 and receive circuit 212 to transmit circuit 211 and outgoing path 253. Call connections through switching network 201 are established under the control of central processor 202 via peripheral unit bus 203.

Figure 3:
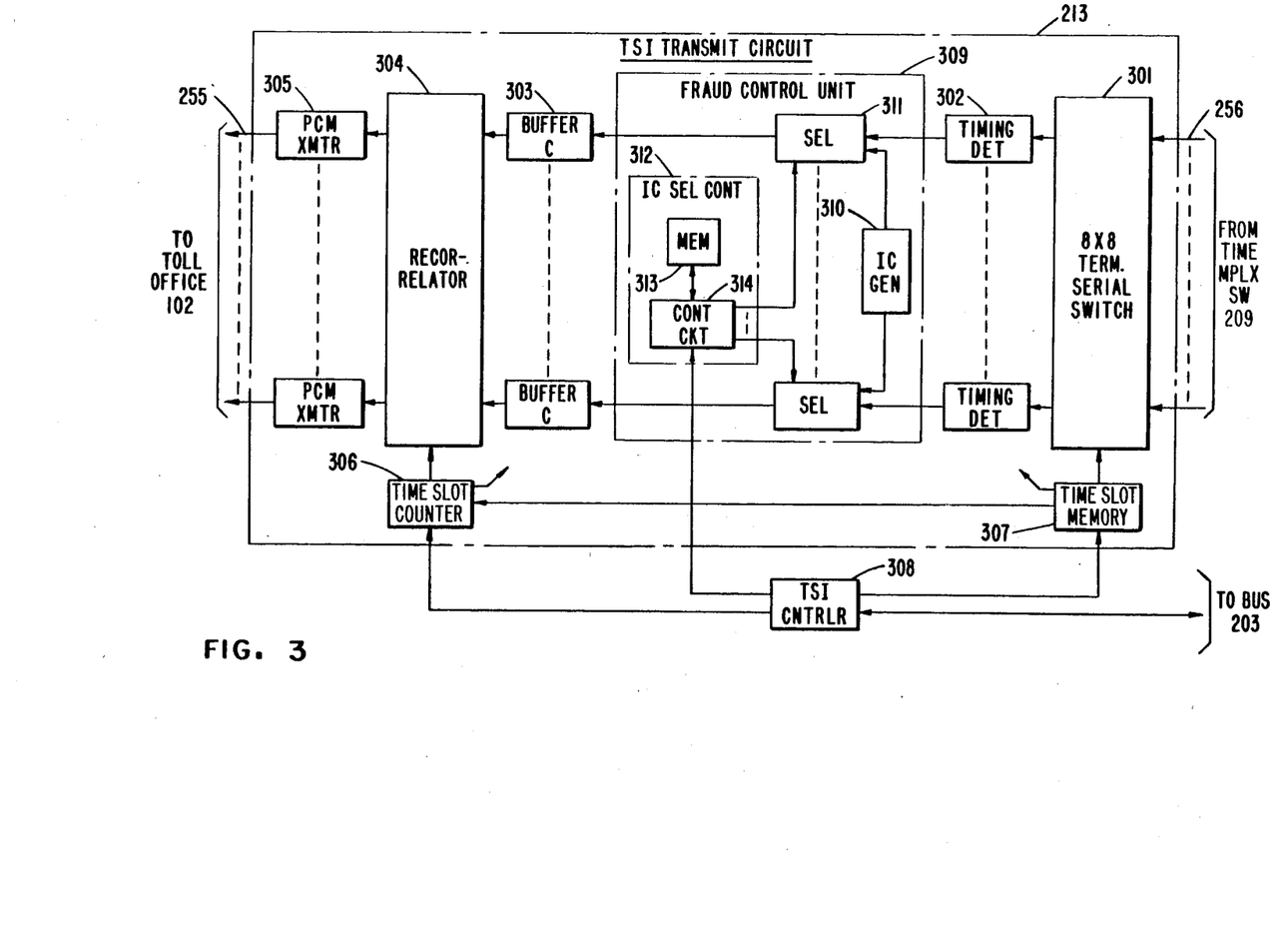
FIG. 3 is a block diagram of a fraud control unit in of the transmit portion of a switching and permuting circuit of the switching system of FIG. 2.

Depicted in FIG. 3 is transmit circuit 213 of time slot interchange unit 208. This well-known transmit circuit described in the previously cited *Bell System Technical Journal*, of September, 1977, includes 8×8 terminating serial switch 301, a plurality of timing detectors such as 302, a plurality of buffer memories such as 303, a recorrelator 304, and a plurality of PCM 35 transmitters such as 305 all under the control of time slot counter 306, time slot memory 307, and time slot interface TSI controller 308 interconnected as shown. The TSI controller receives orders from central processor 202 via bus 203. Interconnected between each of the timing detectors and the buffer memories is fraud control unit 309 also under the control of TSI controller 308. This fraud control unit includes generator 310 for generating idle code for each of the outgoing transmit paths served by the transmit circuit and a plurality of selector circuits such as 311 selectively operable for directing and inserting either the idle code from the generator or communications from the caller on the transmit path into buffer memory 303 for the final stage of time division switching. Each selector is controlled by idle code selector control unit 312 which is under the control of central processor 202 via the TSI controller 308. Selector controller 312 includes well-known memory 313 and control circuitry 314. A well-known busy/idle memory map in memory 313 stores the busy/idle state of each path served by transmit circuit 213, and control circuitry 314 indicates the stored state of a path to the associated selectors. For example, when an idle state is indicated by controller 312, selector 311 directs and inserts the idle code from generator 310 into buffer memory 303 indicative of an idle or a noncommunicative state of the path. When selector controller 312 indicates a busy or communicative state, selector 311 inserts the communications from the caller on path 256 into buffer memory 303 for transmission on one of the outgoing paths such as outgoing transmit path 255.

When a call for a four-wire call connection is received by toll office 101, switching network 201 establishes two unidirectional call connection paths under the control of program-controlled central processor 202. To prevent calls including fraudulent ones from propagating through toll office 101, central processor 202 sends an order to fraud control unit 309 to disable communications on the transmit path and to place the path in a noncommunicative state. This is accomplished by setting the state of the transmit path in the busy/idle memory map of selector control 312 to idle. When this idle state is indicated, selector 311 directs and inserts idle code from generator 310 into buffer memory 303 rather than communication on TMS path 256 from the caller when in the busy state. Thus, any communication from the calling to the called line is prevented until a valid answer signal is received from the called line. Since the receive path of the four-wire call connection remains established and in a communicative state, call progress tones such as ringing, busy, or recorded announcements will all be heard by the caller. However, with communications disabled on the transmit path, it is impossible for the caller to be heard by the person at the called line or for a "blue box" user to forward signals until a valid answer signal is returned for the call. The receipt of an answer signal at the originating local or toll office normally initiates a billing record to charge an identified line or service number for the call.

When valid answer supervision is returned to the toll office, as with most legitimate calls or a toll fraud override supervisory signal is received on an operator trunk, the central processor sets the busy/idle map for transmit path of the call in selector control 312 to the busy state. Selector 311 responds by inserting the communications data on TMS path 256 from the caller into buffer memory 303 which is then switched onto outgoing path 255 to the called line. When answer supervision is not returned such as in the case of a fraudulent call, idle code is continually inserted into outgoing transmit path 255 from the calling to the called line thereby maintaining the transmit path in a noncommunicative state.

Figure 4:
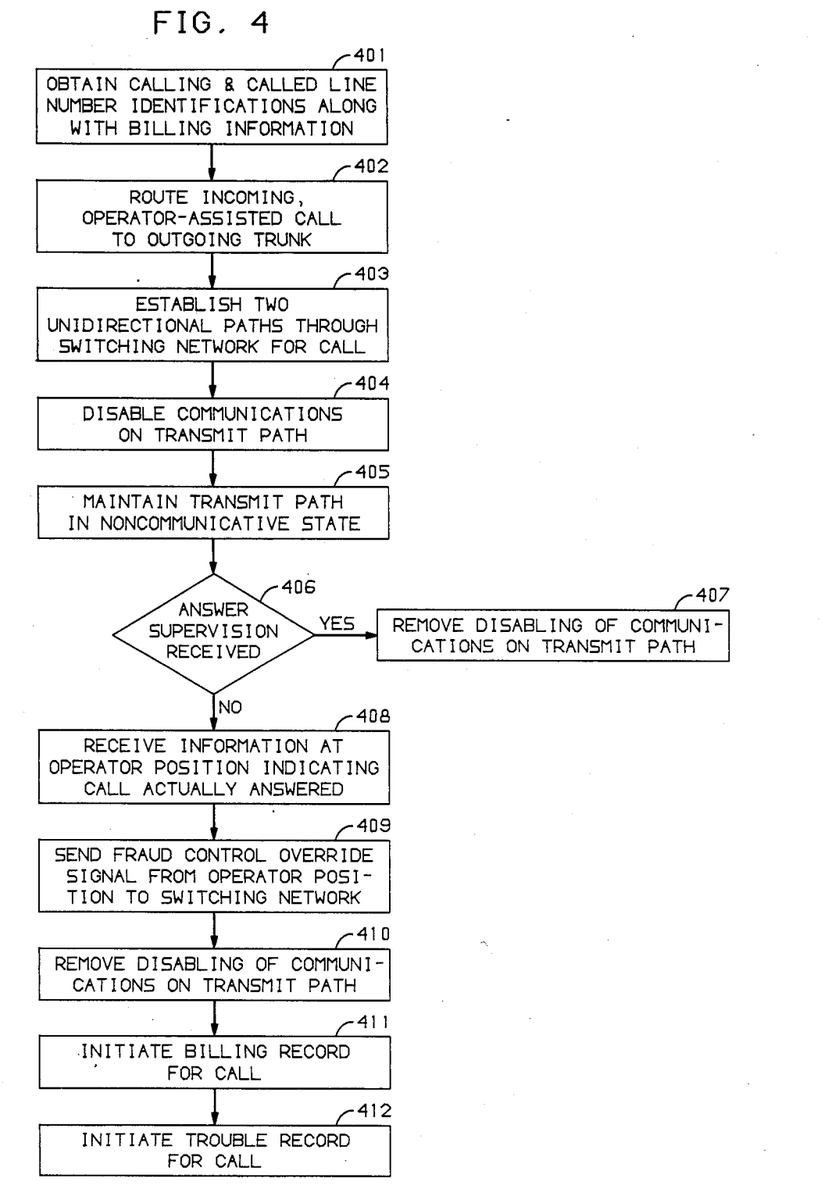
FIG. 4 depicts an illustrative method for overriding the fraud control feature utilized by the switching system of FIG. 2.

Depicted in FIG. 4 is a flow chart illustrating the method of handling operator-assisted calls through a toll switching system office that normally disables communications on the unidirectional transmit path from a calling to a called line until a valid answer supervisory signal is received for the call. This method is implemented by program instructions that are stored in the central processor of a toll switching office and with the previously-described fraud control unit in the transmit portion of the switching and permuting circuit in the TSI unit. For example, upon the receipt of a call at operator position 121 for operator assistance from calling customer line 153 to complete a call to called line 150, the operator thereat obtains calling and called line number identification along with any special billing information and places the call through toll office 101 (block 401). The incoming call is routed through switching network 201 of the office to an outgoing trunk in a well-known manner under the control of program instructions in central processor 202 (block 402). This accomplished by the central processor sending orders to the switching network to establish two unidirectional call connection paths through the switching network to serve the call (block 403). The unidirectional transmit path provides for communication from the calling to the called line, whereas the unidirectional receive path provides for communication from the called line towards the calling line.

The central processor then disables communications on the transmit path from the calling to the called line by sending an order to the busy/idle memory map of selector controller 312 to indicate an idle state to selector 311 for the transmit path 255 (block 404). Sensing the idle state, selector control 312 directs selector 311 to direct and insert idle code from generator 310 into buffer memory 303 for transmission to the called line. The insertion of idle code into the transmit path maintains the path in a noncommunicative state (block 405). This second order does not interfere with any of the normal call processing routines executed by the processor and avoids the need for executing two sets of orders to set up separate transmit and receive paths at different times.

The toll office normally waits for valid answer supervision from the calling line for the call and continues to maintain the transmit path in a noncommunicative state until answer supervision is received for the call or a fraud control override signal is received on an operator trunk for the call. When valid answer supervision is received from the calling line, the central processor removes the disabling of communications on the transmit path by simply sending an order to set the busy/idle memory map of selector control 312 to a busy state for the transmit path (blocks 406–407). The selector for the associated transmit path then inserts the communications on transmit line 256 from the caller into buffer memory 303 for transmission to the called line. The withdrawal or removal of idle code from the transmit path causes the transmit path to enter a communicative state where communications pass freely from the calling to the called line. When valid answer supervision is not returned, the transmit path remains in a noncommunicative state.

Like the frustrated customer, the operator can hear via headset 123 when the customer at called line 158 actually answers the call at station set 112. In addition, the operator can identify the absence of answer supervision from calling line 112 via answer supervision display 122 located at the operator position.

When answer supervision is not received for whatever reason (block 406) and information is received at the operator position indicating that the call has been actually answered (block 408), the operator depresses "ring forward" signal key 124 and sends an override signal to toll office 102 via office 101 to remove the disabling of communications on the transmit path (block 409). Since the "ring forward" supervisory signal is a permitted signal on an operator trunk, central processor 202 responds to this fraud control override signal by setting the busy/idle memory map in selector control 312 to busy for the operator trunk. Like the receipt of answer supervision, selector 311 withdraws the insertion of idle code into the disable transmit path to retore the disabled call connection path from the calling to the called line (block 410).

When the transmit path is placed in a communicative state and two-way communication is established between the calling and called lines, the operator at position 121 in a well-known manner initiates a billing record to charge the caller for the call (block 411). The operator further initiates a trouble record for answered calls not returning answer supervision which is subsequently analyzed for faulty equipment or fraudulent use of the network (block 412).

As an alternative method of preventing fraudulent calls through the network, the central processor may be programmed in a well-known manner to first establish a receive path from the called to the calling line to allow normal call progress signals to be heard by the caller. When answer supervision is returned from the called line, the central processor sends orders to the switching network to set up a separate transmit path from the calling to the called line to complete the two-way communication. This method requires additional programming instructions and real time on the part of the central processor, but is an alternative to the previously described method and apparatus of preventing fraudulent calls from completing through a toll switching system office until answer supervision is returned for the call.

It is to be understood that the above-described system and method for overriding the fraud control of a switching network is merely an illustrative embodiment of the principles of this invention and that numerous other methods and apparatus may be devised by those skilled in the art. In particular, the operations performed by an operator at the operator position may be automatically implemented with well-known program-controlled circuitry in response to the absence of supervision and concurrent persistence of information indicating an actual answer of the call. Speech recognition, tone receiving, and announcement circuitry could likewise perform operator functions in providing customer instructions and collecting billing information.

What is claimed is:

1. In a switching system responsive to a receipt of a call for establishing call connections between a calling and a called line, apparatus comprising:
    means responsive to the establishment of said call connections for disabling communications over one of said call connections until a receipt of answer supervision for said call, and
    means responsive to an absence of said answer supervision and an actual answer of said call concurrently persisting during the absence of said answer supervision for removing the disabling of said communications over said one of said call connections.

2. The apparatus of claim 1 further comprising override means responsive to the absence of said answer supervision and said actual answer concurrently persisting during the absence of said answer supervision for initiating a billing record for said call.

3. The apparatus of claim 2 wherein said override means includes means for indicating the absence of said answer supervision and means for receiving information indicating said actual answer.

4. The apparatus of claim 2 wherein said override means includes means for controlling said removing means to remove the disabling of communications over said one of said call connections in response to the absence of said answer supervision and a receipt of said information concurrently persisting during the absence of said answer supervision.

5. An operator system comprising:
    means for indicating an absence of answer supervision for a call having communications disabled over one of a plurality of call connections at a switching system for serving a calling and called line,
    means for receiving information indicating an actual answer of said call, and
    means controllable by said indicating and receiving means for removing the disabling of communications over said one of call connections in response to the absence of said answer supervision and the receipt of said information concurrently persisting during the absence of said answer supervision.

6. The operator system of claim 5 further comprising means for initiating a billing record for said call in response to the absence of said answer supervision and the receipt of said information concurrently persisting during the absence of said answer supervision.

7. The operator system of claim 5 wherein said removing means includes means for sending to said switching system an override signal effecting the removing of the disabling of communications over said one of said call connections.

8. In a switching system having a network operable for establishing unidirectional communication paths between a calling and a called line, apparatus comprising:
    means responsive to a receipt of a call from said calling line for operating said network to establish a receive one of said paths from said called to said calling line; and
    means responsive to a receipt of answer supervision for said call for operating said network to establish a transmit one of said paths from said calling to said called line and also responsive to an absence of said answer supervision and a receipt of information indicating an actual answer of said call concurrently persisting during the absence of said answer supervision for operating said network to establish said transmit path.

9. The apparatus of claim 8 further comprising means for initiating a billing record for said call in response to the absence of said answer supervision and the receipt of said information concurrently persisting during the absence of said answer supervision.

10. A method of handling calls over call connections having unidirectional communication paths through a switching system which establishes said call connections therethrough for serving a calling and a called line in response to a receipt of a call from said calling line, comprising:
    disabling communications over one of said unidirectional communication paths following the establishment of said call connections until a receipt of answer supervision for said call; and
    removing said disabling of communications over said on unidirectional path in response to an absence of said answer supervision and a receipt of information indicating an actual answer of said call concurrently persisting during the absence of said answer supervision.

11. The method of claim 10 further comprising initiating a billing record for said call in response to the absence of said answer supervision and the receipt of said information concurrently persisting during the absence of said answer supervision.

12. The method of claim 10 wherein said disabling includes inserting on said one unidirectional path an idle code indicating a noncommunicative state of said one path.

13. The method of claim 12 wherein said removing of said disabling of communications over said one unidirectional path includes removing the insertion of said idle code on said one path.

14. A method of handling a call over call connections through a switching system comprising:

maintaining one of said call connections in a noncommunicative state during an absence of answer supervision for said call and until an actual answer of said call during a concurrent persistence of said absence of said answer supervision.

15. The method of claim 14 further comprising initiating a billing record for said call in response to said absence of said answer supervision and a receipt of information indicating said actual answer during a concurrent persistence of said absence of said answer supervision.

16. The method of claim 14 further comprising initiating a trouble record for said call in response to said absence of said answer supervision and a receipt of information indicating said actual answer during a concurrent persistence of said absence of said answer supervision.

17. An operator system comprising:

means for indicating an absence of answer supervision for a call having communications disabled over one of a plurality of call connections at a switching system for serving a calling and a called line, means for receiving information indicating an actual answer of said call, and means activated under operator control during a processing of said call and during a persistence of said actual call answer and said absence of said answer supervision for enabling communications over said one of said call connections.

18. The operator system of claim 17 further comprising means activated under operator control during said persistence of said actual answer and said absence of said answer supervision for initiating a billing record for said call.

* * * * *